US010178121B2

(12) United States Patent
Klatt et al.

(10) Patent No.: US 10,178,121 B2
(45) Date of Patent: Jan. 8, 2019

(54) DOMAIN REPUTATION EVALUATION PROCESS AND METHOD

(71) Applicants: Michael Klatt, Seattle, WA (US); Bruce Wharton Roberts, Carnation, WA (US); Timothy C. Helming, Seattle, WA (US)

(72) Inventors: Michael Klatt, Seattle, WA (US); Bruce Wharton Roberts, Carnation, WA (US); Timothy C. Helming, Seattle, WA (US)

(*) Notice: Subject to any disclaimer, the term of this patent is extended or adjusted under 35 U.S.C. 154(b) by 28 days.

(21) Appl. No.: 14/872,191

(22) Filed: Oct. 1, 2015

(65) Prior Publication Data
US 2017/0099314 A1 Apr. 6, 2017

(51) Int. Cl.
*H04L 29/06* (2006.01)
*H04L 29/12* (2006.01)
*H04L 29/08* (2006.01)

(52) U.S. Cl.
CPC ...... *H04L 63/1441* (2013.01); *H04L 61/1511* (2013.01); *H04L 63/101* (2013.01); *H04L 63/1433* (2013.01); *H04L 63/1483* (2013.01); *G06F 2221/2119* (2013.01); *H04L 61/6018* (2013.01); *H04L 67/02* (2013.01)

(58) Field of Classification Search
CPC ............. H04L 63/1441; H04L 63/1416; H04L 63/1408; H04L 63/1425; H04L 63/1483; H04L 63/145; H04L 61/302; H04L 61/1511; H04L 29/12066; H04L 2463/144
See application file for complete search history.

(56) References Cited

U.S. PATENT DOCUMENTS

| 8,285,830 | B1* | 10/2012 | Stout | H04L 63/1441 709/203 |
| 8,286,239 | B1* | 10/2012 | Sutton | H04L 63/0227 726/22 |
| 8,578,497 | B2* | 11/2013 | Antonakakis | G06F 21/577 709/224 |
| 8,826,434 | B2* | 9/2014 | Merza | H04L 63/1441 726/23 |
| 9,166,994 | B2* | 10/2015 | Ward | H04L 63/1425 |
| 9,173,801 | B2* | 11/2015 | Merza | H04L 63/1441 |
| 9,332,022 | B1* | 5/2016 | Ashley | H04L 63/1408 |
| 9,516,058 | B2* | 12/2016 | Antonakakis | H04L 61/1511 |

(Continued)

*Primary Examiner* — Tae K Kim
(74) *Attorney, Agent, or Firm* — Ellen M. Bierman; Lowe Graham Jones PLLC

(57) ABSTRACT

A system for the identification and subsequent rating of domains based on a result derived from a proprietary algorithm configured to detect when a new domain is registered, correlate the domain to registrant data, cross-check the data based on domain proximity to known-malignity, and output a proximity score employed to convey the potential for malicious content or intentions available or to be served as content accessible via the domain. The system is equipped with a dynamic domain database configured to provide near-real-time domain registration data across all domain extensions, facilitating the detection and scoring of new domains as soon as practicable after their inception. Domains are routinely re-evaluated for score consistency, helping to better maintain the security of visitors to websites hosted, or automated connections to infrastructure present on the domain.

18 Claims, 1 Drawing Sheet

(56) References Cited

U.S. PATENT DOCUMENTS

| | | | |
|---|---|---|---|
| 9,756,068 B2* | 9/2017 | Merza | H04L 63/1441 |
| 2005/0132069 A1* | 6/2005 | Shannon | G06Q 10/00 |
| | | | 709/228 |
| 2006/0168006 A1* | 7/2006 | Shannon | G06Q 10/107 |
| | | | 709/206 |
| 2008/0189263 A1* | 8/2008 | Nagle | G06F 17/30864 |
| 2012/0042381 A1* | 2/2012 | Antonakakis | H04L 63/1483 |
| | | | 726/22 |
| 2013/0055390 A1* | 2/2013 | Bennett | G06F 17/30864 |
| | | | 726/22 |
| 2013/0318603 A1* | 11/2013 | Merza | H04L 63/1441 |
| | | | 726/22 |
| 2015/0200962 A1* | 7/2015 | Xu | G06F 21/562 |
| | | | 726/23 |
| 2015/0213131 A1* | 7/2015 | Styler | H04L 61/1511 |
| | | | 707/767 |

* cited by examiner

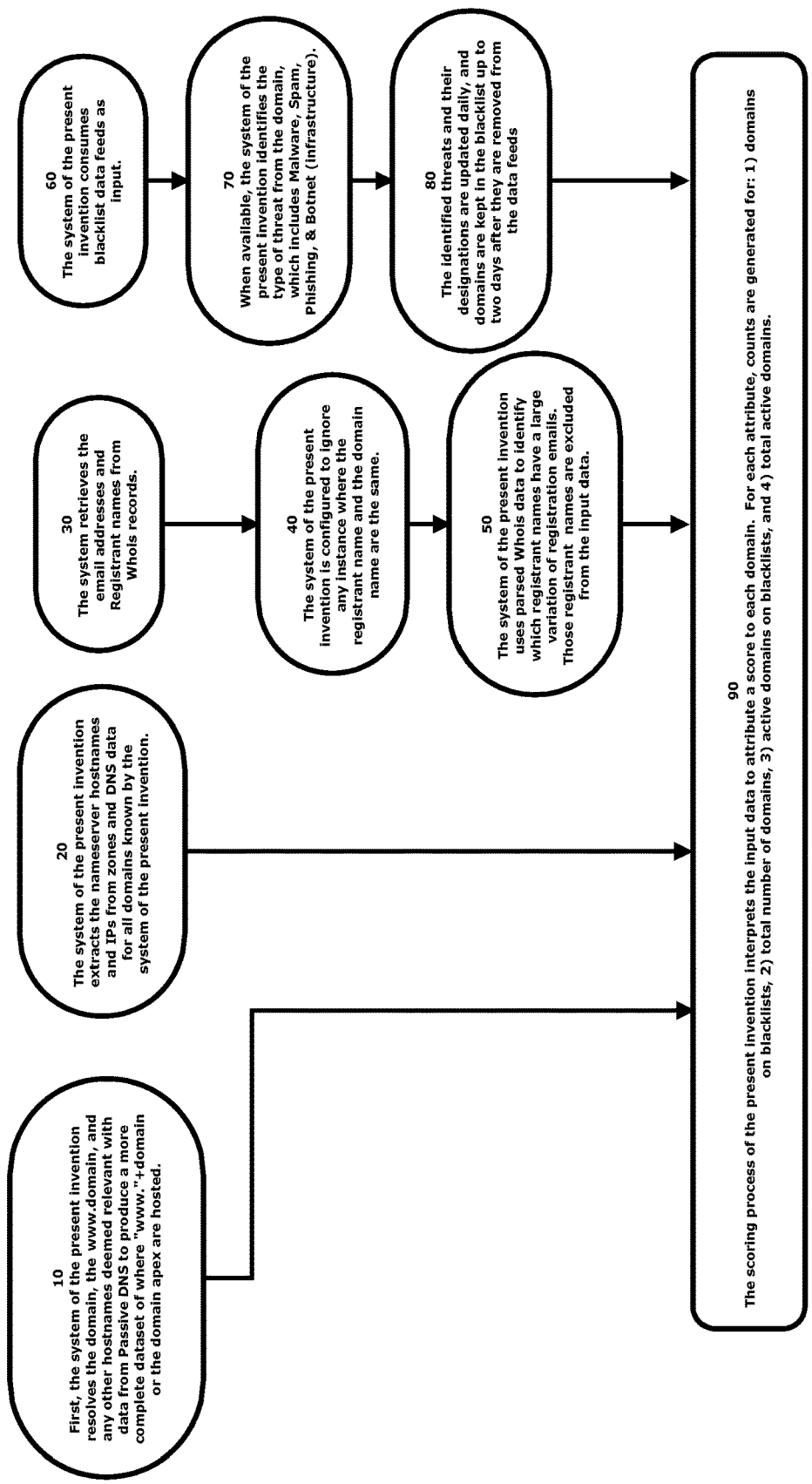

DOMAIN REPUTATION EVALUATION PROCESS AND METHOD

FIELD OF THE PRESENT INVENTION

The field of the present invention relates to Internet security, and more specifically relates to the identification and designation of domains according to proprietary algorithms configured to reliably report on the reputation and potential reputation of new and current domains hosting websites on the internet.

BACKGROUND OF THE PRESENT INVENTION

Cybercrime and hacking cost untold millions of dollars and cause great damage to organizations and individuals. Internet domains (such as google.com or nasa.gov) are used by legitimate organizations and individuals, but domains also can be, and are, registered for illicit purposes quite frequently.

Thousands of malicious domains (relating to spam, phishing, botnet, malware, etc) are created and registered every day. Users and assets have a need to be protected from these domains from their inception. This protection instituted must be automated and scalable because humans cannot possibly intervene at the speed and scale of even the smallest organization's Internet usage. Without an automated system, implemented as part of a firewall or similar system, organizations are exposed to dangerous domains numerous times a day.

There are applications for such a technology that also work at "human speed." Presently, individuals charged with the task of evaluating domains for risk (such as for proposed e-commerce) need a means of quickly assessing the supplicant domain. Banks are known to commonly face such situations daily.

- Computer emergency response teams (CERTs) see large numbers of domains in alerts and logs raised by the systems they monitor. In order to work efficiently, and not to be inundated with data to the point of paralysis, they need a reliable way to sort and filter domains based on the level of risk those domains pose to the organization being defended.
- Law enforcement, government agencies, and other cybercrime investigators need reliable means of assessing the risk of domains they are investigating.

The problem with traditional reputation scoring and blacklisting lies in the delay imposed between domain registration and inception, and detection/flagging of the malicious domain as malicious. Minimizing this delay is key to reducing the damage caused by newly registered malicious domains. There are many reputation scoring systems already in existence. These systems use a variety of methods—some automated, some manual—to assign risk scores to domains. In so doing, they play a valuable role in the fight against cybercrime, hacking, cyberwarfare, etc. However, the common element in existing reputation scoring systems is that they rely on the observation of malicious (or suspicious) activity occurring on domains in order to assign risk scores or place domains on blacklists. This means that there is always at least one—but in practice, typically many more than one—victim that suffers damage from the domain before the domain is properly categorized or "flagged" as malicious, allowing security systems to defend other users from the malicious domain. Because this is a continuous cycle of activity, multitudes of users around the world are harmed by domains that have not been flagged by traditional reputation scoring mechanisms.

Thus, there is a need for a new predictive scoring system configured to expeditiously identify, flag, and address malicious, malware-inducing, or otherwise dangerous domains registered, that employs up-to-date domain and registrant database information to generate a risk score for each domain in existence. Such a system would preferably begin detection of such malicious domains from their inception, and would employ predictive and associative algorithms to potentially flag a malicious domain before damage occurs.

Unlike traditional reputation scoring mechanisms, the system of the present invention generates a Proximity Score that does not rely on the observation of malicious activity in order to assign scores. Rather, it calculates risk based on properties that are with a domain from its inception (in fact, these properties exist before the domain's inception, and the domain inherits them when it is registered and placed online). Thus, the system of the present invention calculates risk based on these properties, and assigns a calculated score as soon as the system is aware of the domain.

Other entities have attempted to craft a similar scoring system to that of the present invention. OpenDNS (www.opendns.com) has developed a predictive URL reputation score that looks, in certain ways, similar to the system of the present invention. However, its features and its underlying technologies differ from those of the present invention. OpenDNS makes use of an algorithm that evaluates whether a domain name was likely generated automatically (by a so-called Domain Generation Algorithm, or DGA), and looks at the IP address connected to the URL. The OpenDNS system does not take domain registrant information into account, and the registrant is one of the strongest connectors between domains. Unfortunately, the OpenDNS system also lacks the comprehensive domain registration database of the present invention.

SUMMARY OF THE PRESENT INVENTION

The present invention is a set of software algorithms designed to predictively assign risk scores to Internet domains, regardless of whether or not those domains have been observed conducting malicious activity—which makes this technology especially and uniquely effective against newly-registered domains. The system of the present invention is configured to function with high efficacy from the inception of the domain, even if the domain has not been accessed or visited yet.

The process of assigning the Proximity Score performed by the present invention requires the best possible database of domain and DNS information. Any such existing standard system that is built upon incomplete or inferior data has an unacceptably low true positive ("catch") rate, and an unacceptably high false positive rate, rendering the conventional system unsuitable for defensive or forensic applications, unlike the present invention. A theoretical, perfect proximity-based reputation engine would have access to the records for every domain in existence, and would receive new domain registration information at the very instant the domain is registered (which occurs approximately 250,000 times each day). As the Internet is currently organized and built, such as system is impossible. However, given the Internet's existing design, the domain discovery and "ingestion" systems that undergird the system of the present invention are far more comprehensive than any others known (a fact which can be independently verified by multiple sources and methods).

The Proximity Score ascribed by the present invention is based on a domain's logical proximity to (or distance from) other domains that are recognized as malicious; "proximity" can also be defined as the strength of the target domain's connections to known-bad domains. Every domain on the Internet has attributes (such as the individual or organization owning the domain) which connect it logically to other domains. In the case of malicious domains, the other domains to which they are closely connected tend, in statistically significant numbers, to themselves be dangerous. Stated differently, malicious domains tend to cluster on the basis of certain shared attributes.

Predictive risk scoring can be a valuable component in host-, cloud-, and network-based security systems such as firewalls, proxy servers, intrusion prevention systems, email and web security systems, and more. The value of predictive scoring is in its ability to defend users against dangerous domains before other systems have identified the domains as dangerous. Without predictive scoring, there is a "window of vulnerability," during which users or systems may be exposed to dangerous domains before those domains have been identified as dangerous. It follows from this that the dangerous domains have to inflict damage before they are identified and blocked, and in fact this occurs daily and globally.

In addition to protecting users and networks from domains that otherwise might not be identified (or identified early enough) as malicious, risk scoring from the system of the present invention, referred to as the DomainTools Reputation Engine's ("DTRE") Proximity to Known Malignity algorithm ("Proximity Score"), which is valuable for cyber-crime investigations, forensics, and incident response. The scores help investigators quickly sort and filter sets of domains they may be investigating, by their likelihood of being malicious. Because investigators are often confronted with large numbers of potential investigation targets, a means of identifying which domains to concentrate on first (or entirely) is of meaningful value.

BRIEF DESCRIPTION OF THE DRAWINGS

The present invention will be better understood with reference to the appended drawing sheet, wherein:

FIG. 1 displays a flow chart depicting the process of the system of the present invention in terms of domain reputation scoring and evaluation.

DETAILED DESCRIPTION OF THE PREFERRED EMBODIMENT

The present invention generally comprises a system providing the capacity and ability to identify connections to malignity of domains at a high accuracy/confidence level. The system of the present invention ascribes a DomainTools Reputation Engine (DTRE) Proximity Score to each domain. The Proximity Score derived via the system of the present invention amounts to a probability rating of the likelihood that a given domain exhibits (or will exhibit) malicious content, malware, viruses, etc. The rating is referenced as a proximity score as the domains are evaluated in context, and with respect to their perceived proximity or relation to other known malicious domains. Relation is established by contextual connections made by the system of the present invention from input data from a variety of sources, wherein the system matches domain ownership data, registration data, blacklist data, nameserver information, and other related information to craft an accurate Proximity Score.

The system of the present invention primarily relies on three indispensable components:

Domain profile information databases (which include, but are not limited to, Whois records, DNS mappings of domain to IP address, and Domain Name Server records): these are the data stores whose completeness and integrity are crucial and unique to DomainTools.

New domain discovery mechanisms: since there is no "master zone file," or database, of every Internet domain in the world, any entity wishing to build a comprehensive database must develop multiple, and ingenious, methods of discovering new domains as they come into existence. This cannot be purchased from any source, but must be built.

Scoring rules: In the metaphor of a physical engine, the domain data stores can be thought of as the engine's "fuel." The engine itself is the set of algorithms that evaluate a target domain's logical connections to other domains, determine how strong those connections are, check the connected domains against well-known sources of "black lists," and assign a score to the target domain. In order to maximize the catch rate and minimize the false positive rate, the scoring rules must be carefully built and tuned.

It should be understood that the Proximity Score of the present invention was designed with three principal use cases in mind:

Network and host defenses: Security systems such as network or host firewalls, network or host intrusion prevention systems (IPS), email filters, web filters, anti-botnet systems, etc, can use the system of the present invention to block traffic to or from domains the system identifies as high-risk.

Pre-connection validation: when a domain proposes to do business of any kind, such as e-commerce, a manual process of evaluating the domain for risk is sometimes invoked. Such a process could use the DTRE Proximity Score to determine whether a given domain appears to be risky.

Incident response and forensics: when investigating security breaches, or known or suspected cybercrime organizations, investigators often review large numbers of domain names. It can be extremely valuable to investigators to have an indication of a domain's probable risk level at-a-glance. It helps investigators prioritize targets for further action, map cybercrime networks, and carry out other investigative and forensic tasks.

FIG. 1 shows the progressive steps of the invention. Steps (10), (20), (30), and (60) may be executed in any order. Steps (40) and (50) run subsequent to step (30). Steps (70) and (80) run subsequent to step (60). Once steps (10) through (80) have run, step (90) can be completed, as detailed below.

The system of the present invention receives numerous data inputs from a variety of sources that enable the system to more accurately predict the nature of a newly registered domain. For example, the following three domain attributes are employed by the algorithm of the present invention to enable full functionality of the present invention:

Domain IP address data—The system of the present invention resolves the domain, the www.domain, and any other hostnames deemed relevant with data from Passive DNS to produce a more complete dataset of where "www."+domain or the domain apex are hosted. (10) The system of the present invention uses the last 30 days of data.

Domain NS data—The system of the present invention extracts the nameserver hostnames and IPs from zones and DNS data for all domains known by the system of the present invention. (20) The system of the present invention include up to 30 days of history. The system of the present invention does not use Passive DNS to augment this data.

Registration data—The system of the present invention retrieves the email addresses and Registrant names from Whois records. (30) The system of the present invention searches for anything that matches an email regular expression (anywhere in the record), and then employs a few hand-built-and-maintained rules for pulling out the registrant name. The system of the present invention is configured to ignore any instance where the registrant name and the domain name are the same. (40) The system of the present invention preferably includes up to 6 months of registration data, but only 30 days of data when a registration change is made.

The system of the present invention applies additional rules to process these input attributes before applying the scoring algorithm:

Ambiguous registrant name data—Some registrant strings, such as "Domain Admin" or "John Smith" are not good for connecting domains since they are not specific enough. The system of the present invention uses parsed Whois data to identify which registrant names have a large variation of registration emails. (50) Those registrant names are excluded from the input data.

Active domains data—The system uses the existence of domains discovered via passive DNS data to indicate if a domain is "active". Additionally, the system of the present invention currently employs six months of data to identify active domains, but it is possible that fewer could be used in alternate embodiments of the present invention This is useful when many domains for an attribute are dormant.

Worldwide domain traffic sources—The system of the present invention tracks the domain traffic made publicly available every day, and identifies those domains which have been in the top 50,000 of that list for the last 150 days. These domains are then excluded from reputation, both from showing up on blacklists and for having a non-zero score.

Excluded domain & attribute data—Additionally, the system has a list of domains and attributes which are excluded from reputation. These excluded domains are to help adjust the algorithm in certain edge cases.

The scoring algorithm uses input attributes along with blacklist data to generate the proximity score.

Domain blacklist data—The system of the present invention consumes blacklist data feeds as input. (60) When available, the system of the present invention identifies the type of threat from the domain, which includes Malware, Spam, Phishing, and Botnet (infrastructure). (70) The identified threats and their designations are updated daily, and domains are kept in the blacklist up to two days after they are removed from the data feeds (helping to mitigate "noise" that is experienced in some blacklist feeds.) (80)).

IP Blacklist data—The system of the preferred embodiment of the present invention employs IP blacklists to help boost risk scores for domains. If a domain is hosted on an IP address which is on a blacklist, the system scores the IP as if it had double the number of malicious domains. The system of the preferred embodiment of the present invention presently employs multiple different IP blacklists as input. IPs are usually blacklisted if they indicate a botnet infection.

Additionally, the scoring process of the present invention interprets the input attributes to determine a score for each domain. For each attribute, counts are generated for: 1) domains on blacklists, 2) total number of domains, 3) active domains on blacklists, and 4) total active domains. (90) Active domains are defined as those seen in the DNS crawl augmented by Passive DNS data recently. Additionally, any attribute blacklist data is included (for instance, IPs can be blacklisted). These counts are used to score every attribute independently. The scoring is roughly executed as follows:

$$\text{total\_ratio} = \text{blacklist domains/total domains}$$

$$\text{active\_ratio} = \text{active blacklist domains/total active domains}$$

$$\text{final\_ratio} = \max(\text{total\_ratio}, \text{active\_ratio})$$

To deal with the blacklisted attributes (like IP), doubling is induced. Therefore, for attributes which are blacklisted, the algorithm looks more like this:

$$\text{total\_ratio} = \max(1, (\text{blacklist domains on this attribute}*2))/\text{total domains}$$

$$\text{active\_ratio} = \max(1, (\text{active blacklist domains on this attribute}*2))/\text{total active domains}$$

$$\text{final\_ratio} = \max(\text{total\_ratio}, \text{active\_ratio})$$

To convert the ratios into a score which fits between 0 and 100, the system preferably executes the following:

$$\text{attribute score} = 100*(\log(100*(\text{final\_ratio})+1)/\log(100+1)$$

The system of the present invention does an "add one" smoothing to avoid negative values. The basic equation represents the ratio of bad/total, but distributes the score between 0 and 100 in such a way that good granularity with the high risk scores is achieved.

Once the attributes are scored, the system of the present invention selects the highest attribute score for the domain proximity score.

$$\text{proximity\_score} = \text{MAXIMUM}(\text{attribute\_score1}, \text{attribute\_score2}, \ldots, \text{attribute\_scoreN})$$

In the implementation embodied here, there are three attributes—IP address, nameserver, and registration data, but additional attributes could be included.

Challenges:

Challenges addressed by the algorithm employed by the system of the present invention include the following:
1) Dormant domains are excluded from lowering the risk score, but the computed risk score is applied across all dormant domains.
2) The system is configured to prevent popular websites from being accidentally blacklisted or having a high risk score to reduce high-impact false positives.
3) Ambiguous registrant strings from reputation are excluded to reduce the risk of collateral damage.
4) 30 days or 6 months of historical attribute data is stored to prevent malicious actors from dodging malicious hotspots.

5) The system of the present invention employs logarithmic scores to get granularity among high risk scores.
6) The system of the present invention extends beyond nameserver hostnames to include nameserver IPs to deal with malicious actors that try to mask their nameserver infrastructure with many nameserver hostnames.
7) The system is configured to include passive DNS data for the IP data to improve timeliness, and effectively capture short-lived domains.
8) The system of the present invention includes up to six months of registration data,
9) The system of the present invention includes multiple sources of blacklist data to achieve exceptional coverage of malware, phishing, and spam domains.
10) The system of the present invention tracks the amount of change in domain scores daily to avoid erratic or unusual changes which could indicate problems with system data.
11) The system of the present invention requires good coverage for all domains in order to be comfortably accurate on the scores generated by the present invention. The system could be deemed biased if limited data were used instead.

Future embodiments of the present invention may include newly integrated algorithms and components configured to enhance the present activities of the present invention.

Additionally, future potential embodiments of the present invention include variations on the speed, duration, and accuracy in malicious domain identification which are envisioned to be implemented into the system of the present invention. The system as currently embodied uses existing blacklists for domain identification. Additions to the identification system as well as additional attributes are envisioned to include:

Automated analysis of the domain name's linguistic coherence: many domains used for malicious activity have names that are nonsensical to humans. For reasons of scale, simplicity, and (relative) anonymity, cybercriminals use automated systems to generate and register domain names. Entropy (randomness) analysis of domain names can automatically identify such names. High-entropy, i.e. nonsensical, names impart a much higher risk profile to a domain.

Automated analysis of the coherence of domain registration records: many cybercriminals enter bogus information into the contact fields of domain registrations, since this is less expensive than using domain privacy services and provides a similar level of anonymity.

Detection of the domain age: statistically speaking, newer domains are more risky than older ones. Integrating domain age into scoring could help provide a more accurate risk profile Analysis of more attributes: other attributes (for example, whether or not the domain has a mail server, whether the registrant is clearly phony, e.g. "Batman") could enrich the risk profile, raising accuracy and potentially aiding in classification (see below).

Classification: Many potential clients for a domain risk scoring service could benefit from classification of the domain (i.e. spam, phishing, botnet) in addition to a simple numeric score, which is to be added to the output of the system of the present invention.

Automated confirmation testing: A mechanism that could automatically determine whether the calculated risk score was accurate (independent of the third-party blacklists) would be valuable. For example, for all domains above a certain score threshold, a script could send HTTP requests to web servers on those domains to see whether malware is downloaded, whether the user is redirected to known-bad domains, etc. Many other mechanisms could be imagined. Such confirmation testing could help with both accuracy and classification.

The proximity_score generated by the system of the present invention may be improved additionally via:

Better "seed" data: if the system obtained and employed higher-quality reputation/blacklist data, the accuracy and possibly the scope of the Proximity Score could be enhanced.

More domains: while we claim, with good evidence, that DomainTools already has the most comprehensive domain profile database in existence, there are still domains for which no information is accessible. Adding these would improve the system.

Finding new domains fluster: In fighting cybercrime infrastructure, minutes (if not seconds) count. Any mechanism that reduces the lag between the completion of a registration at the registrar, and our discovery of the domain, can help us block more bad domains. Some malicious domains are registered, used, and discarded, all within minutes.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. A computer-implemented method for identifying malicious domains by predictively assigning a score to each domain based upon attribute information associated with each domain, comprising:

under control of the computer, given initial input data of domain related information, containing at least some domain names, IP address locations, and/or nameserver hostnames, augmenting the input data by:
using passive DNS data, determining a set of domains which are active domains and augmenting the input data with any determined additional domains;
executing a DNS crawl of all domains identified in the augmented input data to resolve identified domains, the executed DNS crawl resulting in determining associated IP address location information for identified domains and further augmenting the input data with the associated IP address location information;
extracting nameserver hostnames from DNS data and further augmenting the input data with the extracted nameserver hostnames; and identifying and retrieving from Whois data records registration data associated with each domain present in the Whois data records, the registration data including email addresses and registrant names, and further augmenting the input data to associate the retrieved domain registration data with each corresponding domain;

under control of the computer, retrieving information regarding domains and/or IP address locations that are listed on blacklist data as blacklist input data; and under control of the computer, determining a proximity score for each domain in the augmented input data by determining a separate attribute score for each domain attribute for each domain and selecting the maximum attribute score as the proximity score for each domain, the proximity score indicating likelihood that the corresponding domain is malicious based upon similarities of the corresponding domain to the blacklist input data, wherein a domain attribute is at least two of IP address location, nameserver hostname, or registrant data, and wherein determining the proximity score for each domain in the augmented input data, further comprises:

for each value of each domain attribute,
- determining the domains that correspond to the domain attribute value;
- determining counts detailing a total number of the determined domains, a total number of active domains that count the determined domains that are active, a number of active blacklist domains that count the number of active domains that appear on the blacklist input data; and a number of blacklist domains that count the number of determined domains that appear on the blacklist input data;
- determining a total ratio of the number of blacklist domains to the total number of determined domains;
- determining an active ratio of the number of active blacklist domains to the total number of active domains; and
- for each of the determined domain, assigning an attribute score that reflects either the total ratio or the active ratio, whichever reflects a higher proportion of blacklist domains.

2. The method of claim 1 wherein the attribute score is a the greater of the total ratio or the active ratio.

3. The method of claim 1 wherein the attribute score is the total ratio or the active ratio, whichever is greater, converted to a score between 0 and 100.

4. The method of claim 1 wherein the domain attributes include IP address location and nameserver hostname.

5. The method of claim 1 wherein the domain attributes include registrant name or registration email address.

6. The method of claim 1 wherein the number of blacklist domains and the number of active blacklist domains are each multiplied by a factor if the value of the domain attribute is a value appearing on blacklist data.

7. The method of claim 1, further comprising executing a set of rules to exclude data from the augmented input data.

8. The method of claim 7 wherein the rules further comprise excluding ambiguous registrant name data from the augmented input data, wherein ambiguous registrant name data is determined when a registrant name is associated with a variation of registration email addresses.

9. The method of claim 7 wherein the rules further comprise excluding domains from the augmented input data that have been listed as highly trafficked by their inclusion on a public list of top domains.

10. The method of claim 7 wherein the rules further comprise excluding from the augmented input data predesignated domains that are not malicious.

11. The method of claim 7 wherein the rules further comprise:
when, upon identifying and retrieving from Whois data records registration data associated with each domain present in the Whois data records, the retrieved registrant name matches the associated domain name, excluding from the augmented input data the retrieved registrant name.

12. The method of claim 1 wherein the blacklist input data further comprises an identification of threat or designation.

13. The method of claim 12 wherein the threat is at least one of Malware, Spam, Phishing, and infrastructure Botnet.

14. The method of claim 13, further comprising;
under control of the computer, flagging as malicious suspect domains based upon associated proximity scores.

15. The method of claim 1, further comprising: tracking amount of change in each domain proximity score daily.

16. The method of claim 1, further comprising using age of each domain in the augmented input data as an additional domain attribute and as input to the proximity score of each domain.

17. The method of claim 1, further comprising performing the method responsive to discovery or detection of a newly registered domain.

18. The method of claim 1, further comprising: reevaluating the proximity score of domains on a regular basis.

* * * * *

UNITED STATES PATENT AND TRADEMARK OFFICE
CERTIFICATE OF CORRECTION

PATENT NO. : 10,178,121 B2
APPLICATION NO. : 14/872191
DATED : January 8, 2019
INVENTOR(S) : Michael Klatt et al.

Page 1 of 1

It is certified that error appears in the above-identified patent and that said Letters Patent is hereby corrected as shown below:

In the Claims

In Column 9, Line 41 (Claim 1), "domain" should be --domains--.

In Column 9, Line 45 (Claim 2), the "a" should be removed.

Signed and Sealed this
Third Day of September, 2019

Andrei Iancu
*Director of the United States Patent and Trademark Office*